United States Patent
Ling et al.

(10) Patent No.: US 12,545,103 B2
(45) Date of Patent: Feb. 10, 2026

(54) VEHICLE TORQUE CONTROL METHOD AND APPARATUS, ELECTRONIC DEVICE AND STORAGE MEDIUM

(71) Applicant: BYD COMPANY LIMITED, Shenzhen (CN)

(72) Inventors: Heping Ling, Shenzhen (CN); Mingchuan Shi, Shenzhen (CN); Hongxia Wang, Shenzhen (CN); Hao Zhang, Shenzhen (CN); Binhao Zhou, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/933,585

(22) Filed: Oct. 31, 2024

(65) Prior Publication Data

US 2025/0050731 A1 Feb. 13, 2025

Related U.S. Application Data

(63) Continuation of application No. PCT/CN2023/095110, filed on May 18, 2023.

(30) Foreign Application Priority Data

May 20, 2022 (CN) .......................... 202210551565.3

(51) Int. Cl.
  *B60K 23/08* (2006.01)
  *B60K 17/356* (2006.01)

(52) U.S. Cl.
  CPC ........ *B60K 23/0808* (2013.01); *B60K 17/356* (2013.01); *B60K 2023/0858* (2013.01)

(58) Field of Classification Search
  CPC .............. B60K 23/0808; B60K 17/356; B60K 2023/0858; B60K 1/00; B60K 2001/001; B60L 15/20; B60L 15/28; B60L 2220/42; B60L 2220/46; B60L 2240/10; B60L 2240/12; B60L 2240/423; B60L 2260/28
  See application file for complete search history.

(56) References Cited

FOREIGN PATENT DOCUMENTS

| CN | 106143486 A | 11/2016 |
|---|---|---|
| CN | 109606369 A | 4/2019 |
| CN | 111605413 A | 9/2020 |

(Continued)

OTHER PUBLICATIONS

Machine translation of IDS cited CN 111605413 A; pp. 1-10. (Year: 2025).*

(Continued)

*Primary Examiner* — Tisha D Lewis
(74) *Attorney, Agent, or Firm* — Wenye Tan (57) ABSTRACT

A vehicle torque control method is provided for a four-wheel drive vehicle. The vehicle torque control method includes acquiring a front axle equivalent axle speed and a rear axle equivalent axle speed of a vehicle, and determining an equivalent axle speed difference between front axles and rear axles of the vehicle according to the front axle equivalent axle speed and the rear axle equivalent axle speed. The vehicle torque control method also includes determining a drive shaft torque adjustment value according to the equivalent axle speed difference; and adjusting an output torque of a drive shaft motor according to the drive shaft torque adjustment value.

15 Claims, 2 Drawing Sheets

---

| Acquire an equivalent axle speed of a front axle and an equivalent axle speed of a rear axle of a vehicle, and determine an equivalent axle speed difference between the front axle and the rear axle of the vehicle based on the equivalent axle speed of the front axle and the equivalent axle speed of the rear axle | 101 |

| Determine a drive shaft torque adjustment value based on the equivalent axle speed difference | 102 |

| Adjust an output torque of a motor of a drive shaft based on the drive shaft torque adjustment value | 103 |

(56) References Cited

FOREIGN PATENT DOCUMENTS

| | | | |
|---|---|---|---|
| CN | 112078381 | A | 12/2020 |
| CN | 109606369 | B | 1/2021 |
| CN | 107640062 | B | 7/2021 |
| CN | 113085574 | A | 7/2021 |
| CN | 111071064 | B | 9/2021 |
| JP | 2020162373 | A | 10/2020 |
| WO | WO-2020184537 | A1 * | 9/2020 .............. B60L 50/60 |

OTHER PUBLICATIONS

Machine translation of IDS cited CN 112078381 A; pp. 1-22. (Year: 2025).*

Machine translation of IDS cited CN 113085574 A; pp. 1-10. (Year: 2025).*

The World Intellectual Property Organization (WIPO) International Search Report for PCT/CN2023/095110 Sep. 7, 2023 7 Pages (including translation).

* cited by examiner

VEHICLE TORQUE CONTROL METHOD AND APPARATUS, ELECTRONIC DEVICE AND STORAGE MEDIUM

CROSS-REFERENCE TO RELATED APPLICATIONS

The present application is a continuation application of PCT application No. PCT/CN2023/095110, filed on May 18, 2023, which claims priority to Chinese Patent Application No. 202210551565.3, entitled "VEHICLE TORQUE CONTROL METHOD AND APPARATUS, ELECTRONIC DEVICE AND STORAGE MEDIUM" and filed on May 20, 2022. The entire content of all of the above-referenced applications is incorporated herein by reference.

FIELD

The present disclosure relates to the technical field of vehicles, and specifically, to a vehicle torque control method and apparatus, an electronic device and a storage medium.

BACKGROUND

With the development of new energy vehicles, requirements for safety of new energy vehicles are becoming increasingly high. However, for a current four-wheel drive vehicle, a motor torque response speed is relatively high, so that the vehicle is susceptible to slip under special circumstances. To solve this problem, in the related art, closed-loop control is performed when a vehicle speed is within a certain range, and open-loop control is performed when the vehicle speed exceeds the certain range, so that the wheel slip cannot be effectively controlled at a high speed.

SUMMARY

In view of the above problems, embodiments of the present disclosure are proposed to provide a vehicle torque control method and apparatus, an electronic device and a storage medium to overcome or at least partially solve the above problems.

To solve the above problems, an embodiment of the present disclosure discloses a vehicle torque control method applied to a four-wheel drive vehicle. According to the method, an equivalent axle speed of a front axle and an equivalent axle speed of a rear axle of a vehicle are acquired, and an equivalent axle speed difference between the front axle and the rear axle of the vehicle is determined based on the equivalent axle speed of the front axle and the equivalent axle speed of the rear axle. A drive shaft torque adjustment value is determined based on the equivalent axle speed difference. An output torque of a motor of a drive shaft is adjusted based on the drive shaft torque adjustment value.

In another aspect, the present disclosure further discloses an electronic device, including a processor, a memory and a computer program stored in the memory and executable on the processor. The steps of the vehicle torque control method described above are implemented when the computer program is executed by the processor.

In another aspect, the present disclosure further discloses a computer-readable storage medium. The computer-readable storage medium stores a computer program. The steps of the vehicle torque control method described above are implemented when the computer program is executed by a processor.

In another aspect, the present disclosure further discloses a vehicle. The vehicle includes a front motor, a rear motor and a controller. The controller is configured to implement the steps of the vehicle torque control method described above.

The embodiments of the present disclosure have the following advantages.

According to the present disclosure, an equivalent axle speed of a front axle and an equivalent axle speed of a rear axle of a vehicle are acquired, and an equivalent axle speed difference between the front axle and the rear axle of the vehicle is determined based on the equivalent axle speed of the front axle and the equivalent axle speed of the rear axle. A drive shaft torque adjustment value is determined based on the equivalent axle speed difference. An output torque of a motor of a drive shaft is adjusted based on the drive shaft torque adjustment value. According to the present disclosure, wheel slip can be adjusted and controlled by a shaft speed difference between a front drive shaft and a rear drive shaft without adjusting and controlling the wheel slip based on a speed, so that double-shaft closed-loop control can be implemented in a full-speed domain. The wheel slip is found by the shaft speed difference to implement faster adjustment and control, and a motor wheel speed difference between the two shafts can be adjusted and controlled in time, thereby avoiding gratuitous consumption of power.

DETAILED DESCRIPTION

To make the above objective, features and advantages of the present disclosure clearer and more comprehensible, the present disclosure is further described in detail below with reference to the accompanying drawings and specific implementations.

In the related art, to solve the problem of slipping of new energy vehicles under special circumstances, generally, closed-loop control is performed when a vehicle speed is within a certain range, and open-loop control is performed when the vehicle speed exceeds the certain range, so that the wheel slip cannot be effectively controlled at a high speed. Moreover, in the related art, generally, a torque of a front axle is adjusted, which may lead to a decrease of power performance of the whole vehicle. In the related art, rotating speed difference thresholds of the front axle and the rear axle are constant, which may lead to frequent intervention and exit of a torque adjustment module.

One aspect of embodiments of the present disclosure is to provide a vehicle torque control method, to adjust and control wheel slip by a shaft speed difference between a front drive shaft and a rear drive shaft, thereby implementing double-shaft closed-loop control in a full-speed domain.

Figure 1:
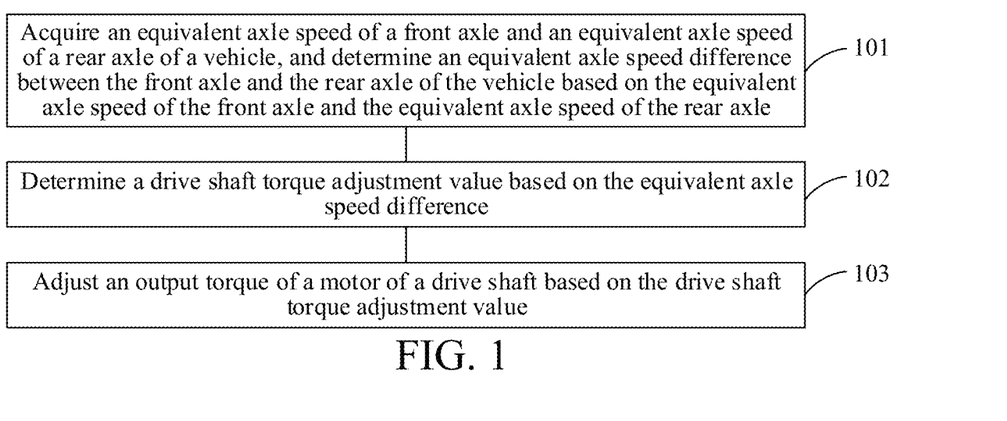
FIG. 1 is a step flowchart of a vehicle torque control method according to an embodiment of the present disclosure.

FIG. 1 is a step flowchart of a vehicle torque control method according to an embodiment of the present disclosure, which may specifically include the following steps.

Step 101: An equivalent axle speed of a front axle and an equivalent axle speed of a rear axle of a vehicle are acquired, and an equivalent axle speed difference between the front axle and the rear axle of the vehicle is determined based on the equivalent axle speed of the front axle and the equivalent axle speed of the rear axle.

It should be understood by a person skilled in the art that this method is applied to four-wheel drive vehicles. With regard to the four-wheel drive vehicle, as the name implies, each of four wheels of the vehicle can obtain power. Four-wheel drive vehicles fall into dual-motor drive vehicles, three-motor drive vehicles and four-motor drive vehicles, including the following cases: a front axle and a rear axle each are driven by a single motor, a front axle and a rear axle each are driven by dual motors, a front axle is driven by a single motor while a rear axle is driven by dual motors, and a front axle is driven by dual motors while a rear axle is driven by a single motor.

In the embodiment of the present disclosure, the vehicle is suitable for a turning condition and a straight-ahead condition. A rotating speed of the motor of the drive shaft can be collected by a motor resolver sensor, and then a shaft speed of the drive shaft driven by a motor can be obtained by the rotating speed of the motor. The equivalent axle speed difference between the front axle and the rear axle can be calculated by subtracting an axle speed of the front axle from an axle speed of the rear axle. Alternatively, wheel speeds of a front wheel and a rear wheel can be collected by a wheel speed sensor, and then the shaft speed of the drive shaft can be calculated based on the wheel speeds of the front wheel and the rear wheel and a transmission ratio between the wheels and the motor. The equivalent axle speed difference between the front axle and the rear axle can be calculated based on the axle speeds of the front axle and the rear axle.

Step 102: A drive shaft torque adjustment value is determined based on the equivalent axle speed difference.

In the embodiment of the present disclosure, it can be determined whether the front drive shaft needs torque adjustment and whether the rear drive shaft needs torque adjustment based on the equivalent axle speed difference, and then based on the equivalent axle speed difference or an absolute value of the equivalent axle speed difference, when the front drive shaft needs to be adjusted, a drive shaft torque adjustment value required for the front drive shaft is calculated, or when the rear drive shaft needs to be adjusted, a drive shaft torque adjustment value required for the rear drive shaft is calculated, or when the front drive shaft and the rear drive shaft need to be adjusted, drive shaft torque adjustment values required for the front drive shaft and the rear drive shaft are calculated. When the equivalent axle speed differences are used for calculation, the obtained adjustment value is positive and negative, but a sign thereof only denotes the adjustment of the front axle or the rear axle, and an actual adjustment value is an absolute value of the obtained drive shaft torque adjustment value.

Step 103: An output torque of a motor of a drive shaft is adjusted based on the drive shaft torque adjustment value.

When the torque of the front drive shaft needs to be reduced, the torque of the rear drive shaft can be increased while the torque of the front drive shaft is reduced based on the drive shaft torque adjustment value. Similarly, when the torque of the rear drive shaft needs to be reduced, the torque of the front drive shaft can be increased while the torque of the rear drive shaft is reduced based on the drive shaft torque adjustment value.

In an embodiment of the present disclosure, only a driving torque of the front axle or only a driving torque of the rear axle may be reduced.

In the embodiment of the present disclosure, the equivalent axle speed of the front axle and the equivalent axle speed of the rear axle of the vehicle are acquired, and the equivalent axle speed difference between the front axle and the rear axle of the vehicle is determined based on the equivalent axle speed of the front axle and the equivalent axle speed of the rear axle. The drive shaft torque adjustment value required for reduction of the equivalent axle speed difference is calculated based on the equivalent axle speed difference. The output torque of the motor of the drive shaft is adjusted based on the drive shaft torque adjustment value. According to the present disclosure, wheel slip is adjusted and controlled by the shaft speed difference between the front drive shaft and the rear drive shaft, so that double-shaft closed-loop control can be implemented in a full-speed domain. The wheel slip is found by the shaft speed difference to implement faster adjustment and control, and a motor speed difference between the two shafts can be adjusted and controlled instantly, thereby preventing or reducing the slip of vehicle wheels and better controlling the vehicle.

Figure 2:
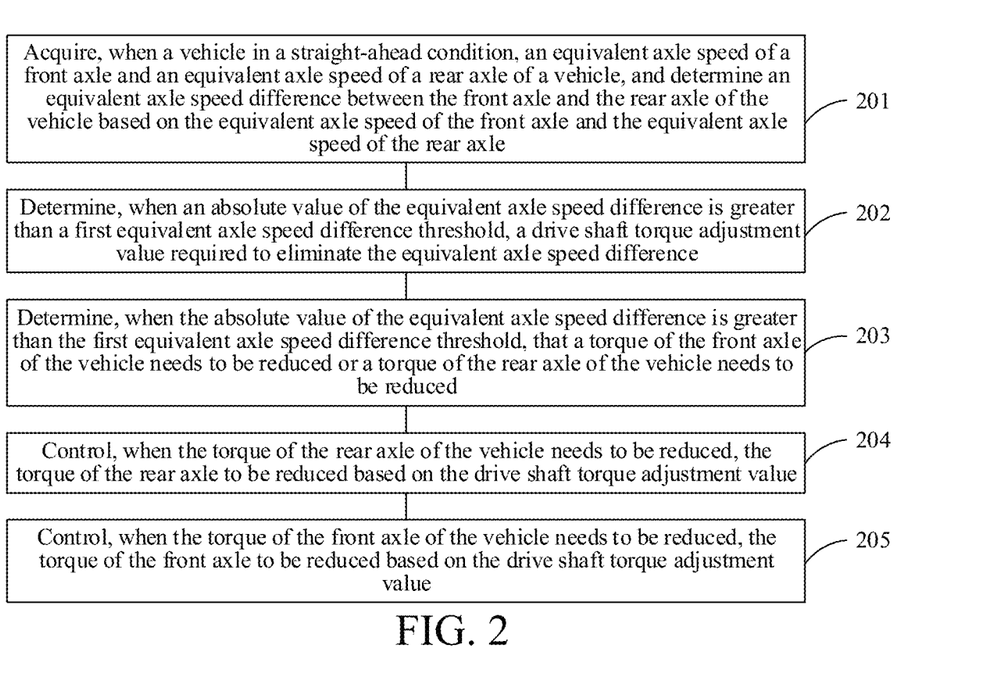
FIG. 2 is a step flowchart of a vehicle torque control method according to another embodiment of the present disclosure.

FIG. 2 is a step flowchart of a vehicle torque control method according to another embodiment of the present disclosure. The method include the following steps.

Step 201: When a vehicle is under a straight-ahead condition, an equivalent axle speed of a front axle and an equivalent axle speed of a rear axle of a vehicle are acquired, and an equivalent axle speed difference between the front axle and the rear axle of the vehicle is determined based on the equivalent axle speed of the front axle and the equivalent axle speed of the rear axle.

In the embodiment of the present disclosure, a steering wheel turning angle δ of the vehicle can be obtained by a steering wheel turning angle sensor, and a steering wheel angular velocity $a_1$ can be calculated by the steering wheel turning angle δ. A steering wheel angle threshold is set as S1, and a steering wheel angular velocity threshold is S2. S1 and S2 are both greater than 0, and can be set based on different types of vehicles before delivery of the vehicle. When an absolute value of δ is less than S1 and a1 is less than S2, it can be determined that the vehicle is under a straight-ahead condition, otherwise it can be determined that the vehicle is under no straight-ahead condition.

Compared with the turning condition, the straight-ahead condition causes wheels to be less affected by the environment, and vehicle slip can be controlled more accurately. This control policy can effectively reduce a loss of a driving capability caused by wheel slip and provide higher acceleration performance and driving stability.

In an embodiment of the present disclosure, that an equivalent axle speed difference between the front axle and the rear axle of the vehicle is determined based on the equivalent axle speed of the front axle and the equivalent axle speed of the rear axle may include:

A rotating speed of a front axle motor of the vehicle is acquired, and an axle speed of the front axle is calculated based on the rotating speed of the front axle motor of the vehicle.

A rotating speed of a rear axle motor of the vehicle is acquired, and an axle speed of the rear axle is calculated based on the rotating speed of the rear axle motor of the vehicle.

A difference between the axle speed of the rear axle and the axle speed of the front axle is calculated to obtain a first equivalent axle speed difference.

Specifically, when the vehicle is in dual-motor drive, a rotating speed of a front motor collected by the motor resolver sensor is set as $w_1$ and a rotating speed of a rear motor collected thereby is set as $w_2$. In this case, the axle speed of the front axle is the rotating speed $w_1$ of the front motor and the axle speed of the rear axle is the rotating speed $w_2$ of the rear motor. A first equivalent rotating speed difference $d_1$ can be calculated by formula (1):

$$d_1 = w_2 - w_1. \qquad \text{formula (1)}$$

When the vehicle is in three-motor drive, front wheels are in single motor drive and rear wheels are in dual-motor drive, a rotating speed of a front motor collected by the motor resolver sensor is set as $w_1$, a rotating speed of a rear wheel left motor collected thereby is set as $w_2$, and a rotating speed of a rear wheel right motor is set as $w_3$. In this case, the axle speed of the front axle is the rotating speed $w_1$ of the front motor, and the axle speed of the rear axle is an average value of rotating speeds of the left and right motors of the rear axle, which is $(w_2+w_3)/2$. A first equivalent axle speed difference $d_1$ can be calculated by formula (2):

$$d_1 = \frac{w_2 + w_3}{2} - w_1. \qquad \text{formula (2)}$$

When the vehicle is in three-motor drive, front wheels are in dual-motor drive and rear wheels are in single motor drive, a rotating speed of a front wheel left motor collected by the motor resolver sensor is set as $w_1$, a rotating speed of a front wheel right motor is set as $w_2$, and a rotating speed of a rear wheel motor is set as $w_3$. In this case, the axle speed of the rear axle is the rotating speed $w_3$ of the rear motor, and the axle speed of the front axle is an average value of rotating speeds of the left and right motors of the front axle, which is $(w_1+w_2)/2$. A first equivalent axle speed difference $d_1$ can be calculated by formula (3):

$$d_1 = w_3 - \frac{w_1 + w_2}{2}. \qquad \text{formula (3)}$$

When the vehicle is in four-motor drive, a rotating speed of a front wheel left motor collected by the resolver sensor is set as $w_1$, a rotating speed of a front wheel right motor is set as $w_2$, a rotating speed of a rear wheel left motor is set as $w_3$, and a rotating speed of a rear wheel right motor is set as $w_4$. The axle speed of the front axle is an average value of rotating speeds of the left and right motors of the front axle, which is $(w_1+w_2)/2$. The axle speed of the rear axle is an average value of rotating speeds of the left and right motors of the rear axle, which is $(w_3+w_4)/2$. A first equivalent axle speed difference $d_1$ can be calculated by formula (4):

$$d_1 = \frac{w_3 + w_4}{2} - \frac{w_1 + w_2}{2}. \qquad \text{formula (4)}$$

In an embodiment of the present disclosure, that an equivalent axle speed difference between the front axle and the rear axle of the vehicle is determined based on the equivalent axle speed of the front axle and the equivalent axle speed of the rear axle may include:

A wheel speed of a front wheel of the vehicle is acquired, and the equivalent axle speed of the front axle is calculated based on the wheel speed of the front wheel of the vehicle.

A wheel speed of a rear wheel of the vehicle is acquired, and the equivalent axle speed of the rear axle is calculated based on the wheel speed of the rear wheel of the vehicle.

A difference between the equivalent axle speed of the rear axle and the equivalent axle speed of the front axle is calculated to obtain a second equivalent axle speed difference.

Specifically, when the vehicle is in three-motor drive, front wheels are driven by a single motor, and rear wheels are driven by dual motors, a wheel speed of a left front wheel collected by the wheel speed sensor is set as $\omega_{fl}$, and a wheel speed of a right front wheel is set as $\omega_{fr}$. A wheel speed of the left front wheel and the right front wheel is equivalent to an average rotating speed at the front axle motor end, which is an equivalent axle speed $\omega_{mfw}$ of the front axle. $\omega_{mfw}$ is calculated by formula (5):

$$\omega_{mfw} = \frac{\omega_{fl} * i_f + \omega_{fr} * i_f}{2}. \qquad \text{formula (5)}$$

$i_f$ is the reduction ratio of a speed reducer between the front motor and a front wheel, and is greater than 1.

A wheel speed of a left rear wheel collected by the wheel speed sensor is set as $\omega_{rl}$, and a wheel speed of a right rear wheel is set as $\omega_{rr}$. A wheel speed of the left rear wheel and the right rear wheel is equivalent to an average rotating speed at the rear axle motor end, which is an equivalent axle speed $\omega_{mrw}$ of the rear axle. $\omega_{mrw}$ is calculated by formula (6):

$$\omega_{mrw} = \frac{\omega_{rl} * i_{rl} + \omega_{rr} * i_{rr}}{2}, \qquad \text{formula (6)}$$

where $i_{rl}$ and $i_{rr}$ are transmission ratios of a left rear motor and a right rear motor to a wheel, and are greater than 1.

Then a second equivalent axle speed difference d2 can be obtained based on a difference between the equivalent axle speed $\omega_{mrw}$ of the rear axle and the equivalent axle speed $\omega_{mfw}$ of the front axle. d2 can be obtained by formula (7):

$$d_2 = \omega_{mrw} - \omega_{mfw}. \qquad \text{formula (7)}$$

It should be noted that when the vehicle is in dual-motor drive or four-motor drive, the second equivalent axle speed difference d2 can be calculated in the same way. Details are not described herein.

In an embodiment of the present disclosure, that an equivalent axle speed difference between the front axle and the rear axle of the vehicle is determined based on the equivalent axle speed of the front axle and the equivalent axle speed of the rear axle may include:

A speed of the vehicle is acquired. When the speed of the vehicle is greater than 0 and less than or equal to a first preset vehicle speed threshold, an axle speed of the front axle is calculated based on a rotating speed of a front axle motor of the vehicle, an axle speed of the rear axle is calculated based on a rotating speed of a rear axle motor of the vehicle, and a difference between the axle speed of the rear axle and the axle speed of the front axle is calculated to obtain a first equivalent axle speed difference.

In the embodiment of the present disclosure, a speed $V_1$ of the vehicle can be collected, and a vehicle speed threshold of the vehicle is set as $V_2$. When $V_1 <= V_2$, because the speed of the vehicle is relatively low, the collected wheel speed is lagging behind, the collected wheel speed is lagging behind, so the equivalent axle speed difference can be calculated more accurately based on the rotating speed difference of the motor of the vehicle. In this case, the first equivalent axle speed difference can be regarded as an equivalent axle speed difference between the front axle and the rear axle of the vehicle.

When the speed of the vehicle is greater than the first preset vehicle speed threshold, the equivalent axle speed of the front axle is calculated based on a wheel speed of a front wheel of the vehicle, the equivalent axle speed of the rear axle is calculated based on a wheel speed of a rear wheel of the vehicle, and a difference between the equivalent axle speed of the rear axle and the equivalent axle speed of the front axle is calculated to obtain a second equivalent axle speed difference.

In an example, when the vehicle speed $V_1 > V_2$, it indicates that the vehicle speed at this time is already high enough. Because it is more accurate to collect a wheel speed than' to collect a rotating speed of a motor when the vehicle is at a high speed, a corresponding equivalent axle speed difference between the front axle and the rear axle of the vehicle can be calculated based on the wheel speed of the vehicle. In this case, the second equivalent axle speed difference can be taken as an equivalent axle speed difference between the front axle and the rear axle of the vehicle.

It should be noted that $V_2$ in the embodiment of the present disclosure is greater than 0, and the vehicle speed threshold of the vehicle can be set before delivery of the vehicle based on different configurations.

Step 202: The drive shaft torque adjustment value is determined when an absolute value of the equivalent axle speed difference is greater than a first equivalent axle speed difference threshold.

The first equivalent axle speed difference threshold is a condition for determining that the vehicle needs to adjust the drive shaft torque. The absolute value of the equivalent axle speed difference is set as $d_{abs}$, and the first equivalent axle speed difference threshold is set as $t_1$. When $d_{abs} >= t_1$, a drive shaft torque adjustment value u(k) required to eliminate the equivalent axle speed difference can be calculated based on formula (8) to formula (10):

$$u(k-1) = J * \frac{d\omega_2}{dt}; \quad \text{formula (8)}$$

$$\Delta u(k) = A(e_k - e_{k-1}) + B e_k + C(e_k - 2e_{k-1} + e_{k-2}); \quad \text{formula (9)}$$

and $$u(k) = u(k-1) + \Delta u(k), \quad \text{formula (10)}$$

where k denotes a current time, J denotes a moment of inertia of a wheel, $\omega_2$ denotes a corrected value of the equivalent axle speed difference, A is a proportional coefficient, B is an integral coefficient, C is a differential coefficient, $e_k$ denotes a difference value of the equivalent axle speed difference at a different time, and $\Delta Auk$) denotes an increment of the drive shaft torque adjustment value.

In an embodiment of the present disclosure, step 202 may include the following sub-step S21.

Sub-step S21: It is continuously determined whether the absolute value of the equivalent axle speed difference is greater than the first equivalent axle speed difference threshold. When the absolute value of the equivalent axle speed difference is greater than the first equivalent axle speed difference threshold, with the torque adjustment value as a target, the torque of the drive shaft is continuously reduced until the absolute value of the equivalent axle speed difference is less than a second equivalent difference threshold. Adjustment is stopped when the absolute value is less than the second equivalent difference threshold. The first equivalent axle speed difference threshold is greater than the second equivalent difference threshold.

In the embodiment of the present disclosure, the first equivalent axle speed difference threshold is greater than the second equivalent difference threshold, and when the equivalent axle speed difference reaches the first equivalent axle speed difference threshold, it indicates that there is a slipping wheel. A torque adjustment value of the drive shaft corresponding to the slipping wheel is calculated, and the output torque of the motor of the drive shaft is adjusted based on the torque adjustment value. In the whole process, it is continuously determined whether the absolute value of the equivalent axle speed difference is less than a second equivalent axle speed difference threshold. When the absolute value of the equivalent axle speed difference is greater than the second equivalent axle speed difference threshold, a table can be looked up based on a current actual torque of the other shaft motor to find an adjustment step size that the corresponding motor can bear, and magnitudes of the adjustment step size and the torque adjustment value are determined. When the adjustment step size is less than the torque adjustment value, the output torque of the motor of the drive shaft to be adjusted is reduced by a preset step size. When the adjustment step size is greater than the torque adjustment value, the output torque of the motor of the drive shaft to be adjusted is reduced with the torque adjustment value as a step size. When the absolute value of the equivalent axle speed difference is greater than the first equivalent axle speed difference threshold, the output torque of the motor of the drive shaft to be adjusted is continuously reduced until the absolute value of the equivalent axle speed difference is less than the second equivalent difference threshold. When the absolute value is less than the second equivalent difference threshold, adjustment is stopped. According to the present disclosure, the two equivalent difference thresholds are introduced, and one is large while the other is small, so that the vehicle exits after reaching a more stable state than a control target, so as to avoid frequent triggering and exit of a control policy.

Step 203: When an absolute value of the equivalent axle speed difference is greater than a first equivalent axle speed difference threshold, it is determined that a torque of the front axle of the vehicle needs to be reduced or a torque of the rear axle of the vehicle needs to be reduced.

In the embodiment of the present disclosure, the equivalent axle speed difference may be positive or negative. When the absolute value of the equivalent axle speed difference is greater than the first equivalent axle speed difference threshold, it can be determined whether the torque of the rear axle or the rear axle of the vehicle needs to be reduced based on to a sign of the equivalent axle speed difference.

In an embodiment of the present disclosure, that it is determined that a torque of the front axle of the vehicle needs to be reduced or a torque of the rear axle of the vehicle needs to be reduced may include sub-steps S22 and S23.

Sub-step S22: When the equivalent axle speed difference is greater than 0, it is determined that the torque of the rear axle of the vehicle needs to be reduced.

When the equivalent axle speed difference is greater than 0, and the equivalent axle speed difference is obtained by subtracting the axle speed of the front axle from the axle speed of the rear axle, it indicates that the axle speed of the rear axle is greater than the axle speed of the front axle, and the axle speeds of the front axle and the rear axle need to be balanced by reducing the torque of the rear axle, so as to restrain slipping or reduce a degree of wheel slipping.

Sub-step S23: When the equivalent axle speed difference is less than 0, it is determined that the torque of the front axle of the vehicle needs to be reduced.

When the equivalent axle speed difference is less than 0, it indicates that the axle speed of the front axle is greater than the axle speed of the rear axle, and the axle speed of the front axle needs to be balanced with the axle speed of the rear axle by reducing the torque of the front axle, so as to restrain slipping or reduce a degree of wheel slipping.

Step 204: When the torque of the rear axle of the vehicle needs to be reduced, the torque of the rear axle is controlled to be reduced based on the drive shaft torque adjustment value.

In an embodiment of the present disclosure, when the torque of the rear axle of the vehicle needs to be reduced, the method further includes: The torque of the front axle is controlled to be increased based on the drive shaft torque adjustment value.

Alternatively, when the torque of the front axle of the vehicle needs to be reduced, the method further includes: The torque of the rear axle is controlled to be increased based on the drive shaft torque adjustment value.

In an embodiment of the present disclosure, that the torque of the front axle is controlled to be increased based on the drive shaft torque adjustment value includes: A front axle torque adjustment threshold is acquired. If the drive shaft torque adjustment value is less than or equal to the front axle torque adjustment threshold, the torque of the rear axle is reduced based on the drive shaft torque adjustment value, and a torque value of the front axle is increased based on the drive shaft torque adjustment value, or if the drive shaft torque adjustment value is greater than the front axle torque adjustment threshold, the torque value of the front axle is increased based on the front axle torque adjustment threshold, and the torque of the rear axle is reduced based on the drive shaft torque adjustment value.

In the embodiment of the present disclosure, an axle with a torque being reduced is set as an axle 1, while an axle with a torque being increased is set as an axle 2. The front axle torque adjustment threshold means a maximum torque value by which the drive shaft with a torque being increased can increase, that is, a difference between the motor torque value of the shaft motor at this time and a physical upper limit value of the motor. During torque adjustment, when the front axle torque adjustment threshold is greater than or equal to the drive shaft torque adjustment value, the torque of the rear axle is reduced based on the drive shaft torque adjustment value, and the torque value of the front axle is increased based on the drive shaft torque adjustment value. Requirements for a total torque of the two axles are constant in the whole process, so that a driving force of the vehicle is ensured while vehicle slip is prevented, thereby ensuring driving performance of the vehicle during slip restraining.

During torque adjustment, when the front axle torque adjustment threshold is less than the drive shaft torque adjustment value, the front axle torque value is increased until the front axle torque increment reaches the torque adjustment threshold, and then the increase of the front axle torque is stopped. The torque value of the rear axle is reduced based on the drive shaft torque adjustment value until there is no requirement for torque reduction of the rear axle. Requirements for a total torque of the two axles are not lowered in the whole process, so that a driving force of the vehicle is ensured while vehicle slip is prevented, thereby ensuring driving performance of the vehicle during slip restraining.

It can be understood that the torque adjustment value is a torque value that the vehicle needs to adjust under a current vehicle condition.

In an embodiment of the present disclosure, that the torque of the rear axle is controlled to be increased based on the drive shaft torque adjustment value includes: A rear axle torque adjustment threshold is acquired. If the drive shaft torque adjustment value is less than or equal to the rear axle torque adjustment threshold, the torque of the front axle is reduced based on the drive shaft torque adjustment value, and the torque of the rear axle is increased based on the drive shaft torque adjustment value, or if the drive shaft torque adjustment value is greater than the front axle torque adjustment threshold, a torque value of the rear axle is increased based on the rear axle torque adjustment threshold, and the torque of the front axle is reduced based on the drive shaft torque adjustment value.

In the embodiment of the present disclosure, an axle with a torque being reduced is set as an axle 1, while an axle with a torque being increased is set as an axle 2. The rear axle torque adjustment threshold means a maximum torque value by which the rear drive shaft with a torque being increased can increase. During torque adjustment, when the rear axle torque adjustment threshold is greater than or equal to the drive shaft torque adjustment value, the torque of the front axle is reduced based on the drive shaft torque adjustment value, and the torque value of the rear axle is increased based on the drive shaft torque adjustment value. Requirements for a total torque of the two axles are constant in the whole process, so that a driving force of the vehicle is ensured while vehicle slip is prevented, thereby ensuring driving performance of the vehicle during slip restraining.

During torque adjustment, when the rear axle torque adjustment threshold is less than the drive shaft torque adjustment value, the rear axle torque value is increased based on the rear axle torque adjustment threshold until the front axle torque increment reaches the torque adjustment threshold, and then the increase of the rear axle torque is stopped. The torque value of the front axle is reduced based on the drive shaft torque adjustment value until there is no requirement for torque reduction of the front axle. Requirements for a total torque of the two axles are lowered in the whole process, so that a driving force of the vehicle is ensured while vehicle slip is prevented, thereby ensuring driving performance of the vehicle during slip restraining.

In an embodiment of the present disclosure, that an output torque of a motor of a drive shaft is adjusted based on the drive shaft torque adjustment value may include: A front axle torque lower limit value is determined. If a current output torque of the motor of the drive shaft is less than or equal to the torque lower limit value after the drive shaft torque adjustment value is reduced, the output torque of the motor of the drive shaft is adjusted to the torque lower limit value.

In an embodiment of the present disclosure, that an output torque of a motor of a drive shaft is adjusted based on the drive shaft torque adjustment value may include: A rear axle torque lower limit value is determined. If a current output torque of the motor of the drive shaft is less than or equal to the torque lower limit value after the drive shaft torque adjustment value is reduced, the output torque of the motor of the drive shaft is adjusted to the torque lower limit value.

In the embodiment of the present disclosure, the drive shaft torque lower limit value can be obtained, and the torque lower limit value means a minimum value to which the torque of the shaft can be adjusted. If the current output torque of the motor of the drive shaft is less than or equal to the torque lower limit value after the drive shaft torque adjustment value is reduced, it indicates the minimum value of the torque of the shaft is reached. For example, when the drive shaft torque adjustment value is 50 N*m, the output torque of the drive shaft that needs to be reduced currently is 30 N*m and the lower limit value is −10 N*m, the torque of the drive shaft that needs to be reduced currently is −20 N*m after being reduced by 50 N*m, and is less than the torque lower limit value. As a result, the torque can only be reduced to the lower limit value.

If the current output torque of the motor of the drive shaft is greater than the torque lower limit value after the drive shaft torque adjustment value is reduced, it indicates the minimum value of the torque of the shaft is not reached, and the output torque of the drive shaft is reduced based on the drive shaft torque adjustment value. For example, when the drive shaft torque adjustment value is 50 N*m, the output torque of the drive shaft that needs to be reduced currently is 30 N*m and the lower limit value is −40 N*m, the torque of the drive shaft that needs to be reduced currently is −20 N*m after being reduced by 50 N*m, and is greater than the torque lower limit value. As a result, the output torque of the motor of the drive shaft can be reduced based on the drive shaft torque adjustment value.

In an embodiment of the present disclosure, that a front axle torque lower limit value is determined may include: It is determined that the front axle torque lower limit value is 0 when an absolute value of the equivalent axle speed difference is less than a third equivalent axle speed difference threshold, or it is determined that the front axle torque lower limit value is a torque limit value of motor reversal when the absolute value of the equivalent axle speed difference is greater than the third equivalent axle speed difference threshold. The third equivalent axle speed difference threshold is greater than the first equivalent axle speed difference threshold.

In the embodiment of the present disclosure, the third equivalent axle speed difference threshold is greater than the first equivalent axle speed difference threshold. When the absolute value of the equivalent axle speed difference is greater than the third equivalent axle speed difference threshold, it indicates that the torque that needs to be reduced is relatively large, and the equivalent axle speed difference may not be eliminated after the output torque of the drive shaft is reduced to 0. In this case, the torque still needs to continue to be reduced, and the torque of the shaft may be set as a physical limit value of motor reversal. When the absolute value of the equivalent axle speed difference is less than the third equivalent axle speed difference threshold, it indicates that the equivalent axle speed difference can be eliminated or reduced after the output torque of the drive shaft is reduced to 0. In this case, the front axle torque lower limit value may be set to 0.

In an embodiment of the present disclosure, that a rear axle torque lower limit value is determined may include: It is determined that the rear axle torque lower limit value is 0 when an absolute value of the equivalent axle speed difference is less than a third equivalent axle speed difference threshold, or it is determined that the rear axle torque lower limit value is a torque limit value of motor reversal when the absolute value of the equivalent axle speed difference is greater than the third equivalent axle speed difference threshold. The third equivalent axle speed difference threshold is greater than the first equivalent axle speed difference threshold.

In the embodiment of the present disclosure, the third equivalent axle speed difference threshold is greater than the first equivalent axle speed difference threshold. When the absolute value of the equivalent axle speed difference is greater than the third equivalent axle speed difference threshold, it indicates that the torque that needs to be reduced is relatively large, and the equivalent axle speed difference may not be eliminated after the output torque of the drive shaft is reduced to 0. In this case, the torque still needs to continue to be reduced, and the torque of the shaft may be set as a physical limit value of motor reversal. When the absolute value of the equivalent axle speed difference is less than the third equivalent axle speed difference threshold, it indicates that the equivalent axle speed difference can be eliminated or reduced after the output torque of the drive shaft is reduced to 0. In this case, the rear axle torque lower limit value may be set to 0.

In an embodiment of the present disclosure, that a front axle torque lower limit value and a rear axle torque lower limit value are determined may include: It is determined that the front axle torque lower limit value and the rear axle torque lower limit value are 0 when an absolute value of the equivalent axle speed difference is less than a third equivalent axle speed difference threshold, or it is determined that the front axle torque lower limit value and the rear axle torque lower limit value each are a torque limit value of motor reversal when the absolute value of the equivalent axle speed difference is greater than the third equivalent axle speed difference threshold. The third equivalent axle speed difference threshold is greater than the first equivalent axle speed difference threshold.

In the embodiment of the present disclosure, the third equivalent axle speed difference threshold is greater than the first equivalent axle speed difference threshold. When the absolute value of the equivalent axle speed difference is greater than the third equivalent axle speed difference threshold, it indicates that the torque that needs to be reduced is relatively large, and the equivalent axle speed difference may not be eliminated after the output torque of the drive shaft is reduced to 0. In this case, the torque still needs to continue to be reduced, and the torque of the shaft may be set as a physical limit value of motor reversal. When the absolute value of the equivalent axle speed difference is less than the third equivalent axle speed difference threshold, it indicates that the equivalent axle speed difference can be eliminated or reduced after the output torque of the drive shaft is reduced to 0. In this case, the front axle torque lower limit value and the rear axle torque lower limit value may be set to 0.

According to the present disclosure, wheel slip can be reduced or restrained by the shaft speed difference between the front drive shaft and the rear drive shaft without adjusting and controlling the wheel slip based on a speed, so that double-shaft closed-loop control can be implemented in a full-speed domain. The wheel slip is found by the shaft speed difference to implement faster adjustment and control, and a motor wheel speed difference between the two shafts can be adjusted and controlled in time, thereby avoiding gratuitous consumption of power. According to the present disclosure, two equivalent rotating speed difference thresholds are introduced, and one is large while the other is small, so that the torque reduction of the drive shaft does not stop until the equivalent rotating speed difference is less than the smaller equivalent rotating speed difference threshold, and the vehicle can exit after reaching a more stable state than the control target, thereby avoiding frequent triggering and exit of a control policy. According to the present disclosure, the torque can alternatively be transferred between the front axle and the rear axle, that is, one axle increases while the other axle decreases, so that requirements for the torque of the whole vehicle remain unchanged while the wheel slip is eliminated.

It should be noted that for simplicity of description, the method embodiments are expressed as a series of action combinations, but a person skilled in the art should be aware that the embodiments of the present disclosure are not limited by the described action sequence, because according to embodiments of the present disclosure, certain steps may be performed in other sequences or simultaneously. A person skilled in the art should also be aware that the embodiments described in the specification are preferred embodiments, and that the actions involved are not necessarily required for embodiments of the present disclosure.

Figure 3:
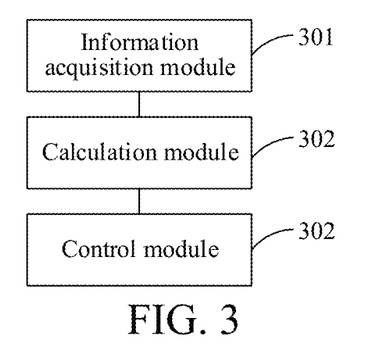
FIG. 3 is a step flowchart of a vehicle torque control apparatus according to an embodiment of the present disclosure.

FIG. 3 is a step flowchart of a vehicle torque control apparatus according to an embodiment of the present disclosure. The vehicle torque control apparatus may include:
 an information acquisition module 301, configured to acquire an equivalent axle speed of a front axle and an equivalent axle speed of a rear axle of a vehicle;
 a calculation module 302, configured to determine an equivalent axle speed difference between the front axle and the rear axle of the vehicle based on the equivalent axle speed of the front axle and the equivalent axle speed of the rear axle, and determine a drive shaft torque adjustment value based on the equivalent axle speed difference; and
 a control module 303, configured to adjust an output torque of a motor of a drive shaft based on the drive shaft torque adjustment value.

In an embodiment, the information acquisition module 301 may include:
 a first equivalent axle speed difference determining submodule, configured to acquire the equivalent axle speed of the front axle and the equivalent axle speed of the rear axle of the vehicle when the vehicle is under a straight-ahead condition.

In an embodiment, the calculation module 302 may include:
 a second equivalent axle speed difference determining submodule, configured to acquire a rotating speed of a front axle motor of the vehicle is acquired, and calculate an axle speed of the front axle based on the rotating speed of the front axle motor of the vehicle; acquire a rotating speed of a rear axle motor of the vehicle, and calculate an axle speed of the rear axle based on the rotating speed of the rear axle motor of the vehicle; and calculate a difference between the axle speed of the rear axle and the axle speed of the front axle to obtain a first equivalent axle speed difference.

In an embodiment, the calculation module 302 may include:
 a third equivalent axle speed difference determining submodule, configured to acquire a wheel speed of a front wheel of the vehicle, and calculate the equivalent axle speed of the front axle based on the wheel speed of the front wheel of the vehicle; acquire a wheel speed of a rear wheel of the vehicle, and calculate the equivalent axle speed of the rear axle based on the wheel speed of the rear wheel of the vehicle; and calculate a difference between the equivalent axle speed of the rear axle and the equivalent axle speed of the front axle to obtain a second equivalent axle speed difference.

In an embodiment, the calculation module 302 may include:
 a fourth equivalent axle speed difference determining submodule, configured to acquire a speed of the vehicle; calculate, when the speed of the vehicle is greater than 0 and less than or equal to a first preset vehicle speed threshold, an axle speed of the front axle based on a rotating speed of a front axle motor of the vehicle, calculate an axle speed of the rear axle based on a rotating speed of a rear axle motor of the vehicle, and calculate a difference between the axle speed of the rear axle and the axle speed of the front axle to obtain a first equivalent axle speed difference; and calculate, when the speed of the vehicle is greater than the first preset vehicle speed threshold, the equivalent axle speed of the front axle based on a wheel speed of a front wheel of the vehicle, calculate the equivalent axle speed of the rear axle based on a wheel speed of a rear wheel of the vehicle, and calculate a difference between the equivalent axle speed of the rear axle and the equivalent axle speed of the front axle to obtain a second equivalent axle speed difference.

In an embodiment, the calculation module 302 may include:
 a torque calculation submodule, configured to determine the drive shaft torque adjustment value when an absolute value of the equivalent axle speed difference is greater than a first equivalent axle speed difference threshold.

In an embodiment, the control module 303 may include:
 an equivalent axle speed difference adjustment unit, configured to continuously determine whether the absolute value of the equivalent axle speed difference is greater than the first equivalent axle speed difference threshold, reduce, when the absolute value of the equivalent axle speed difference is greater than the first equivalent axle speed difference threshold, with the drive shaft torque adjustment value as a step size, the torque of the drive shaft until the absolute value of the equivalent axle speed difference is less than a second equivalent difference threshold, and stop adjustment when the absolute value is less than the second equivalent difference threshold. The first equivalent axle speed difference threshold is greater than the second equivalent difference threshold.

In an embodiment, the control module 303 may include:
 a first motor control submodule, configured to determine, when an absolute value of the equivalent axle speed difference is greater than a first equivalent axle speed difference threshold, that a torque of the front axle of the vehicle needs to be reduced or a torque of the rear axle of the vehicle needs to be reduced;
 a second motor control submodule, configured to control, when the torque of the rear axle of the vehicle needs to be reduced, the torque of the rear axle to be reduced based on the drive shaft torque adjustment value; and a third motor control submodule, configured to control, when the torque of the front axle of the vehicle needs to be reduced, the torque of the front axle to be reduced based on the drive shaft torque adjustment value.

In an embodiment, the first motor control submodule further includes:

a first motor control unit, configured to determine, when the equivalent axle speed difference is greater than 0, that the torque of the rear axle of the vehicle needs to be reduced; and a second motor control unit, configured to determine, when the equivalent axle speed difference is less than 0, that the torque of the front axle of the vehicle needs to be reduced.

In an embodiment, the second motor control submodule may include:

a third motor control unit, configured to control the torque of the front axle to be increased based on the drive shaft torque adjustment value, or control, when the torque of the front axle of the vehicle needs to be reduced, the torque of the rear axle to be increased based on the drive shaft torque adjustment value.

In an embodiment, the third motor control unit may include:

a front axle torque adjustment threshold acquisition unit, configured to acquire a front axle torque adjustment threshold;

a front axle torque value increasing unit, configured to reduce, if the drive shaft torque adjustment value is less than or equal to the front axle torque adjustment threshold, the torque of the rear axle based on the drive shaft torque adjustment value, and increase a torque value of the front axle based on the drive shaft torque adjustment value; and a rear axle torque reduction unit, configured to increase, if the drive shaft torque adjustment value is greater than the front axle torque adjustment threshold, the torque value of the front axle based on the front axle torque adjustment threshold, and reduce the torque of the rear axle based on the drive shaft torque adjustment value.

In an embodiment, the third motor control unit includes:

a rear axle torque adjustment threshold acquisition unit, configured to acquire a rear axle torque adjustment threshold;

a rear axle torque value increasing unit, configured to reduce, if the drive shaft torque adjustment value is less than or equal to the rear axle torque adjustment threshold, the torque of the front axle based on the drive shaft torque adjustment value, and increase the torque of the rear axle based on the drive shaft torque adjustment value; and a front axle torque reduction unit, configured to increase, if the drive shaft torque adjustment value is greater than the front axle torque adjustment threshold, a torque value of the rear axle based on the rear axle torque adjustment threshold, and reduce the torque of the front axle based on the drive shaft torque adjustment value.

In an embodiment, the control module 303 may include:

a torque lower limit value determining submodule, configured to determine a front axle torque lower limit value; and a torque adjustment submodule, configured to adjust, if a current output torque of the motor of the drive shaft is less than or equal to the torque lower limit value after the drive shaft torque adjustment value is reduced, the output torque of the motor of the drive shaft to the torque lower limit value.

In an embodiment, the torque lower limit value determining submodule may include:

a first torque lower limit value determining unit, configured to determine that the front axle torque lower limit value is 0 when an absolute value of the equivalent axle speed difference is less than a third equivalent axle speed difference threshold; and a second torque lower limit value determining unit, configured to determine that the front axle torque lower limit value is a torque limit value of motor reversal when the absolute value of the equivalent axle speed difference is greater than the third equivalent axle speed difference threshold. The third equivalent axle speed difference threshold is greater than the first equivalent axle speed difference threshold.

In an embodiment, the control module 303 may include:

a torque lower limit value determining submodule, configured to determine a rear axle torque lower limit value; and a torque adjustment submodule, configured to adjust, if a current output torque of the motor of the drive shaft is less than or equal to the torque lower limit value after the drive shaft torque adjustment value is reduced, the output torque of the motor of the drive shaft to the torque lower limit value.

In an embodiment, the torque lower limit value determining submodule may include:

a first torque lower limit value determining unit, configured to determine that the rear axle torque lower limit value is 0 when an absolute value of the equivalent axle speed difference is less than a third equivalent axle speed difference threshold; and a second torque lower limit value determining unit, configured to determine that the rear axle torque lower limit value is a torque limit value of motor reversal when the absolute value of the equivalent axle speed difference is greater than the third equivalent axle speed difference threshold. The third equivalent axle speed difference threshold is greater than the first equivalent axle speed difference threshold.

In an embodiment, the control module 303 may include:

a torque lower limit value determining submodule, configured to determine a front axle torque lower limit value and a rear axle torque lower limit value; and a torque adjustment submodule, configured to adjust, if a current output torque of the motor of the drive shaft is less than or equal to the torque lower limit value after the drive shaft torque adjustment value is reduced, the output torque of the motor of the drive shaft to the torque lower limit value.

In an embodiment, the torque lower limit value determining submodule may include:

a first torque lower limit value determining unit, configured to determine that the front axle torque lower limit value and the rear axle torque lower limit value are 0 when an absolute value of the equivalent axle speed difference is less than a third equivalent axle speed difference threshold; and a second torque lower limit value determining unit, configured to determine that the front axle torque lower limit value and the rear axle torque lower limit value each are a torque limit value of motor reversal when the absolute value of the equivalent axle speed difference is greater than the third equivalent axle speed difference threshold. The third equivalent axle speed difference threshold is greater than the first equivalent axle speed difference threshold.

According to the present disclosure, wheel slip can be adjusted and controlled by a shaft speed difference between a front drive shaft and a rear drive shaft without adjusting and controlling the wheel slip based on a speed, so that double-shaft closed-loop control can be implemented in a full-speed domain. The wheel slip is found by the shaft speed difference to implement faster adjustment and control, and a motor wheel speed difference between the two shafts can be adjusted and controlled in time, thereby avoiding gratuitous consumption of power.

The present disclosure further discloses an electronic device, including a processor, a memory and a computer program stored in the memory and executable on the processor. The steps of the vehicle torque control method described above are implemented when the computer program is executed by the processor.

The present disclosure further discloses a computer-readable storage medium. The computer-readable storage medium stores a computer program. The steps of the vehicle torque control method described above are implemented when the computer program is executed by a processor.

The present disclosure further discloses a vehicle. The vehicle includes a front motor, a rear motor and a controller. The controller is configured to implement the steps of the vehicle torque control method described above.

Since the apparatus embodiment is substantially similar to the method embodiment, the description is relatively simple. For relevant parts, refer to the description of the method embodiment.

The embodiments in this specification are all described in a progressive manner. Descriptions of each embodiment focus on differences from other embodiments, and same or similar parts among respective embodiments may be mutually referenced.

A person skilled in the art should understand that, the embodiments of this application may be provided as methods, apparatuses, or computer program products. Therefore, the embodiments of this application may use a form of hardware-only embodiments, software-only embodiments, or embodiments in which software and hardware are combined. In addition, the embodiments of the present disclosure may use a form of a computer program product implemented on one or more computer-usable storage media (including but not limited to a disk memory, a CD-ROM and an optical memory) including computer-usable program code.

The embodiments of the present disclosure are described with reference to flowcharts and/or block diagrams of the method, terminal device (system), and computer program product in the embodiments of the present disclosure. It should be understood that computer program instructions can implement each process and/or block in the flowcharts and/or block diagrams and a combination of processes and/or blocks in the flowcharts and/or block diagrams. These computer program instructions may be provided to a processor of a general purpose computer, a special purpose computer, an embedded processor or other programmable data processing terminal devices to produce a machine, so that the instructions executed by a processor of a computer or other programmable data processing terminal devices are used to produce an apparatus configured to implement functions specified in one or more processes of the flowcharts and/or one or more blocks of the block diagrams.

These computer program instructions may alternatively be stored in a computer-readable memory that can instruct a computer or other programmable data processing terminal devices to operate in a specific manner, so that the instructions stored in the computer-readable memory are used to produce a product including an instruction apparatus, and the instruction apparatus implements functions specified in one or more processes of the flowcharts and/or one or more blocks of the block diagrams.

These computer program instructions may alternatively be loaded on a computer or other programmable data processing terminal devices, so that a series of operation steps are performed on the computer or other programmable terminal devices to produce computer-implemented processing, and therefore the instructions executed on the computer or other programmable terminal devices are used to provide steps for implementing functions specified in one or more processes of the flowcharts and/or one or more blocks of the block diagrams.

Although embodiments of the present disclosure have been described, additional changes and modifications may be made to these embodiments by a person skilled in the art once basic inventive concepts are known. Therefore, the appended claims are intended to be construed to include the preferred embodiments as well as all changes and modifications that fall within the scope of the embodiments of the present disclosure.

Finally, it should be noted that relational terms herein such as "first" and "second" are merely used to distinguish one entity or operation from another entity or operation without necessarily requiring or implying any actual such relationship or order between such entities or operations. Moreover, the terms "include", "comprise" or any other variants thereof are intended to cover non-exclusive inclusion, so that a process, method, article or terminal device including a series of elements not only includes those elements, but also includes those elements that are not explicitly listed, or also includes elements inherent to this process, method, article or terminal device. Without further limitation, the element defined by the sentence "including a . . ." does not exclude that other identical elements are also present in the process, method, article or terminal device including the elements.

The vehicle torque control method and apparatus, the electronic device, and the storage medium according to the present disclosure are described above in detail. Although the principles and implementations of the present disclosure are described by applying specific examples herein, the descriptions of the above embodiments are merely intended to help understand the method and the core idea of the method according to the present disclosure. In addition, for a person of ordinary skill in the art, changes may be made to the specific implementations and application range based on the idea of the present disclosure. To sum up, the contents of this specification should not be construed as a limitation to the present disclosure.

What is claimed is:

1. A vehicle torque control method applied to a four-wheel drive vehicle, comprising:
    acquiring an equivalent axle speed of a front axle and an equivalent axle speed of a rear axle of a vehicle, and determining an equivalent axle speed difference between the front axle and the rear axle of the vehicle based on the equivalent axle speed of the front axle and the equivalent axle speed of the rear axle;
    determining a drive shaft torque adjustment value based on the equivalent axle speed difference; and adjusting an output torque of a motor of a drive shaft based on the drive shaft torque adjustment value, wherein the adjusting an output torque of a motor of a drive shaft based on the drive shaft torque adjustment value comprises:

determining a front axle torque lower limit value; and adjusting, if a current output torque of the motor of the drive shaft is less than or equal to the torque lower limit value after the drive shaft torque adjustment value is reduced, the output torque of the motor of the drive shaft to the torque lower limit value, or determining a rear axle torque lower limit value; and adjusting, if the current output torque of the motor of the drive shaft is less than or equal to the torque lower limit value after the drive shaft torque adjustment value is reduced, the output torque of the motor of the drive shaft to the torque lower limit value.

2. The method according to claim 1, wherein the acquiring an equivalent axle speed of a front axle and an equivalent axle speed of a rear axle of a vehicle comprises:

acquiring the equivalent axle speed of the front axle and the equivalent axle speed of the rear axle of the vehicle when the vehicle is under a straight-ahead condition.

3. The method according to claim 1, wherein the determining an equivalent axle speed difference between the front axle and the rear axle of the vehicle based on the equivalent axle speed of the front axle and the equivalent axle speed of the rear axle comprises:

acquiring a rotating speed of a front axle motor of the vehicle, and calculating an axle speed of the front axle based on the rotating speed of the front axle motor of the vehicle;

acquiring a rotating speed of a rear axle motor of the vehicle, and calculating an axle speed of the rear axle based on the rotating speed of the rear axle motor of the vehicle; and calculating a difference between the axle speed of the rear axle and the axle speed of the front axle to obtain a first equivalent axle speed difference.

4. The method according to claim 3, wherein the determining an equivalent axle speed difference between the front axle and the rear axle of the vehicle based on the equivalent axle speed of the front axle and the equivalent axle speed of the rear axle comprises:

acquiring a wheel speed of a front wheel of the vehicle, and calculating the equivalent axle speed of the front axle based on the wheel speed of the front wheel of the vehicle;

acquiring a wheel speed of a rear wheel of the vehicle, and calculating the equivalent axle speed of the rear axle based on the wheel speed of the rear wheel of the vehicle; and calculating a difference between the equivalent axle speed of the rear axle and the equivalent axle speed of the front axle to obtain a second equivalent axle speed difference.

5. The method according to claim 1, wherein the determining an equivalent axle speed difference between the front axle and the rear axle of the vehicle based on the equivalent axle speed of the front axle and the equivalent axle speed of the rear axle comprises:

acquiring a speed of the vehicle;

calculating, when the speed of the vehicle is greater than 0 and less than or equal to a first preset vehicle speed threshold, an axle speed of the front axle based on a rotating speed of a front axle motor of the vehicle, calculating an axle speed of the rear axle based on a rotating speed of a rear axle motor of the vehicle, and calculating a difference between the axle speed of the rear axle and the axle speed of the front axle to obtain a first equivalent axle speed difference; and calculating, when the speed of the vehicle is greater than the first preset vehicle speed threshold, the equivalent axle speed of the front axle based on a wheel speed of a front wheel of the vehicle, calculating the equivalent axle speed of the rear axle based on a wheel speed of a rear wheel of the vehicle, and calculating a difference between the equivalent axle speed of the rear axle and the equivalent axle speed of the front axle to obtain a second equivalent axle speed difference.

6. The method according to claim 1, wherein the determining a drive shaft torque adjustment value based on the equivalent axle speed difference comprises:

determining the drive shaft torque adjustment value when an absolute value of the equivalent axle speed difference is greater than a first equivalent axle speed difference threshold.

7. The method according to claim 6, wherein the adjusting an output torque of a motor of a drive shaft based on the drive shaft torque adjustment value comprises:

continuously determining whether the absolute value of the equivalent axle speed difference is greater than the first equivalent axle speed difference threshold, reducing, when the absolute value of the equivalent axle speed difference is greater than the first equivalent axle speed difference threshold, the torque of the drive shaft until the absolute value of the equivalent axle speed difference is less than a second equivalent axle speed difference threshold, and stopping adjustment when the absolute value is less than the second equivalent axle speed difference threshold, wherein the first equivalent axle speed difference threshold is greater than the second equivalent axle speed difference threshold.

8. A vehicle torque control method applied to a four-wheel drive vehicle, comprising:

acquiring an equivalent axle speed of a front axle and an equivalent axle speed of a rear axle of a vehicle, and determining an equivalent axle speed difference between the front axle and the rear axle of the vehicle based on the equivalent axle speed of the front axle and the equivalent axle speed of the rear axle;

determining a drive shaft torque adjustment value based on the equivalent axle speed difference; and adjusting an output torque of a motor of a drive shaft based on the drive shaft torque adjustment value, wherein the adjusting an output torque of a motor of a drive shaft based on the drive shaft torque adjustment value comprises:

determining, when an absolute value of the equivalent axle speed difference is greater than a first equivalent axle speed difference threshold, that a torque of the front axle of the vehicle needs to be reduced or a torque of the rear axle of the vehicle needs to be reduced;

controlling, when the torque of the rear axle of the vehicle needs to be reduced, the torque of the rear axle to be reduced based on the drive shaft torque adjustment value; and controlling, when the torque of the front axle of the vehicle needs to be reduced, the torque of the front axle to be reduced based on the drive shaft torque adjustment value, wherein the determining that a torque of the front axle of the vehicle needs to be reduced or a torque of the rear axle of the vehicle needs to be reduced comprises:
determining, when the equivalent axle speed difference is greater than 0, that the torque of the rear axle of the vehicle needs to be reduced, or
determining, when the equivalent axle speed difference is less than 0, that the torque of the front axle of the vehicle needs to be reduced.

9. The method according to claim 8, when the torque of the rear axle of the vehicle needs to be reduced, the method further comprising:
controlling the torque of the front axle to be increased based on the drive shaft torque adjustment value, or
when the torque of the front axle of the vehicle needs to be reduced, the method further comprising:
controlling the torque of the rear axle to be increased based on the drive shaft torque adjustment value.

10. The method according to claim 9, wherein the controlling the torque of the front axle to be increased based on the drive shaft torque adjustment value comprises:
acquiring a front axle torque adjustment threshold; and
reducing, if the drive shaft torque adjustment value is less than or equal to the front axle torque adjustment threshold, the torque of the rear axle based on the drive shaft torque adjustment value, and increasing the torque of the front axle based on the drive shaft torque adjustment value, or
increasing, if the drive shaft torque adjustment value is greater than the front axle torque adjustment threshold, the torque of the front axle based on the front axle torque adjustment threshold, and reducing the torque of the rear axle based on the drive shaft torque adjustment value.

11. The method according to claim 10, wherein the controlling the torque of the rear axle to be increased based on the drive shaft torque adjustment value comprises:
acquiring a rear axle torque adjustment threshold; and
reducing, if the drive shaft torque adjustment value is less than or equal to the rear axle torque adjustment threshold, the torque of the front axle based on the drive shaft torque adjustment value, and increasing the torque of the rear axle based on the drive shaft torque adjustment value, or
increasing, if the drive shaft torque adjustment value is greater than the front axle torque adjustment threshold, a torque value of the rear axle based on the rear axle torque adjustment threshold, and reducing the torque of the front axle based on the drive shaft torque adjustment value.

12. The method according to claim 7, wherein the determining a front axle torque lower limit value comprises:
determining that the front axle torque lower limit value is 0 when an absolute value of the equivalent axle speed difference is less than a third equivalent axle speed difference threshold, or
determining that the front axle torque lower limit value is a torque limit value of motor reversal when the absolute value of the equivalent axle speed difference is greater than the third equivalent axle speed difference threshold, the third equivalent axle speed difference threshold being greater than a first equivalent axle speed difference threshold.

13. The method according to claim 7, wherein the determining a rear axle torque lower limit value comprises:
determining that the rear axle torque lower limit value is 0 when an absolute value of the equivalent axle speed difference is less than a third equivalent axle speed difference threshold, or
determining that the rear axle torque lower limit value is a torque limit value of motor reversal when the absolute value of the equivalent axle speed difference is greater than the third equivalent axle speed difference threshold, the third equivalent axle speed difference threshold being greater than a first equivalent axle speed difference threshold.

14. An electronic device, comprising a processor, a memory and a computer program stored in the memory and executable on the processor, and when the computer program is executed by the processor, the processor being configured to perform:
acquiring an equivalent axle speed of a front axle and an equivalent axle speed of a rear axle of a vehicle, and determining an equivalent axle speed difference between the front axle and the rear axle of the vehicle based on the equivalent axle speed of the front axle and the equivalent axle speed of the rear axle;
determining a drive shaft torque adjustment value based on the equivalent axle speed difference; and
adjusting an output torque of a motor of a drive shaft based on the drive shaft torque adjustment value,
wherein the adjusting an output torque of a motor of a drive shaft based on the drive shaft torque adjustment value comprises:
determining a front axle torque lower limit value; and adjusting, if a current output torque of the motor of the drive shaft is less than or equal to the torque lower limit value after the drive shaft torque adjustment value is reduced, the output torque of the motor of the drive shaft to the torque lower limit value, or
determining a rear axle torque lower limit value; and adjusting, if a current output torque of the motor of the drive shaft is less than or equal to the torque lower limit value after the drive shaft torque adjustment value is reduced, the output torque of the motor of the drive shaft to the torque lower limit value.

15. A vehicle, comprising a front motor, a rear motor and a control device according to claim 14.

* * * * *